United States Patent
Porter et al.

(10) Patent No.: US 6,288,511 B2
(45) Date of Patent: Sep. 11, 2001

(54) AUTOMOTIVE CONVERTIBLE TOP SYSTEM

(75) Inventors: Michael A. Porter, Southgate; Richard H. Kruse, Farmington Hills, both of MI (US); Samuel DiCesare, Glencoe; Kerry S. Berland, Chicago, both of IL (US); James M. Helms, Southgate; George A. Alderton, IV, Royal Oak, both of MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 09/802,246

(22) Filed: Mar. 8, 2001

Related U.S. Application Data

(63) Continuation of application No. 09/634,436, filed on Aug. 8, 2000, which is a continuation of application No. 09/174,697, filed on Oct. 16, 1998, now Pat. No. 6,114,819, which is a continuation of application No. 08/524,541, filed on Sep. 7, 1995, now Pat. No. 5,825,147, which is a continuation of application No. 08/087,194, filed on Jul. 2, 1993, now Pat. No. 5,451,849, which is a continuation-in-part of application No. 07/817,299, filed on Jan. 6, 1992, now Pat. No. 5,225,747.

(51) Int. Cl.⁷ .................................................... H02P 3/00
(52) U.S. Cl. .................. 318/466; 318/265; 318/467; 318/282; 296/112; 296/115; 296/110
(58) Field of Search ..................................... 318/265, 282, 318/467, 466; 296/107.01, 110, 112, 115

(56) References Cited

U.S. PATENT DOCUMENTS

| | | | |
|---|---|---|---|
| 2,105,293 | 1/1938 | Paulin | 296/107 |
| 2,617,972 | 11/1952 | Nutter | 318/483 |
| 2,640,958 | 6/1953 | Davis | 318/740 |
| 2,731,588 | 1/1956 | McLeod | 318/483 |
| 2,753,508 | 7/1956 | Inman | 318/483 |

(List continued on next page.)

FOREIGN PATENT DOCUMENTS

| | | |
|---|---|---|
| D. 3532982 | 3/1987 | (DE) . |
| D. 3728008 | 2/1989 | (DE) . |
| D. 3826789 | 1/1991 | (DE) . |
| D. 4028584 | 11/1991 | (DE) . |
| 63-93622 | 4/1988 | (JP) . |

Primary Examiner—Robert E. Nappi
Assistant Examiner—Rita Leykin
(74) Attorney, Agent, or Firm—Harness, Dickey & Pierce, P.L.C.

(57) ABSTRACT

This invention relates to a system and method for monitoring and controlling the operation of a motorized convertible top such that it may be extended and retracted automatically. The system and method of the present invention monitors the movement of the various components to provide fluid, simultaneous motion. It further detects and corrects improper alignments that may result in damage to the top due to overlapping elements or binding elements, and stores error information useful in diagnosing and repairing unrecoverable errors.

69 Claims, 4 Drawing Sheets

U.S. PATENT DOCUMENTS

| | | | |
|---|---|---|---|
| 2,770,489 | 11/1956 | Garvey et al. | 296/117 |
| 2,939,742 | 6/1960 | Dardarian et al. | 296/107 |
| 3,716,945 | 2/1973 | Cooper et al. | 49/139 |
| 4,082,347 | 4/1978 | Petretti | 296/98 |
| 4,408,146 | 10/1983 | Beckerman | 318/264 |
| 4,446,407 | 5/1984 | Sperber | 318/282 |
| 4,553,656 | 11/1985 | Lense | 192/142 R |
| 4,556,835 | 12/1985 | Vogel et al. | 318/663 |
| 4,608,637 | 8/1986 | Okuyama et al. | 364/424 |
| 4,644,235 | 2/1987 | Ohta | 318/282 |
| 4,749,193 | 6/1988 | Hacker | 296/107 |
| 4,766,356 | 8/1988 | Handa et al. | 296/117 X |
| 4,776,630 | 10/1988 | Fukutomi et al. | 367/87 |
| 4,799,729 * | 1/1989 | Muscat | 296/136 |
| 4,852,469 | 8/1989 | Chuang | 318/226 X |
| 4,895,409 | 1/1990 | Konishi et al. | 296/107 |
| 5,018,784 | 5/1991 | Yokouchi | 296/219 |
| 5,042,868 | 8/1991 | Nothaft et al. | 296/107 |
| 5,054,686 | 10/1991 | Chuang | 236/49.3 |
| 5,056,857 | 10/1991 | Ney | 296/107 |
| 5,058,939 * | 10/1991 | Miilu | 292/110 |
| 5,067,768 | 11/1991 | Fischbach | 296/107 |
| 5,110,175 | 5/1992 | Filchbach | 296/117 |
| 5,159,247 | 10/1992 | Resch | 318/466 X |
| 5,186,516 * | 2/1993 | Alexander et al. | 296/121 |
| 5,221,905 | 6/1993 | Bhangu et al. | 324/713 |
| 5,225,747 | 7/1993 | Helms et al. | 318/286 X |
| 5,242,210 | 9/1993 | Fujisawa et al. | 296/219 |
| 5,334,876 | 8/1994 | Washeleski et al. | 318/469 X |
| 5,451,849 | 9/1995 | Porter et al. | 318/466 |
| 5,620,226 | 4/1997 | Sautter, Jr. | 296/107 |
| 5,825,147 | 10/1998 | Porter et al. | 312/466 |
| 5,864,214 | 1/1999 | Brodsky | 318/282 |
| 6,024,403 | 2/2000 | Ritter et al. | 296/117 |

* cited by examiner

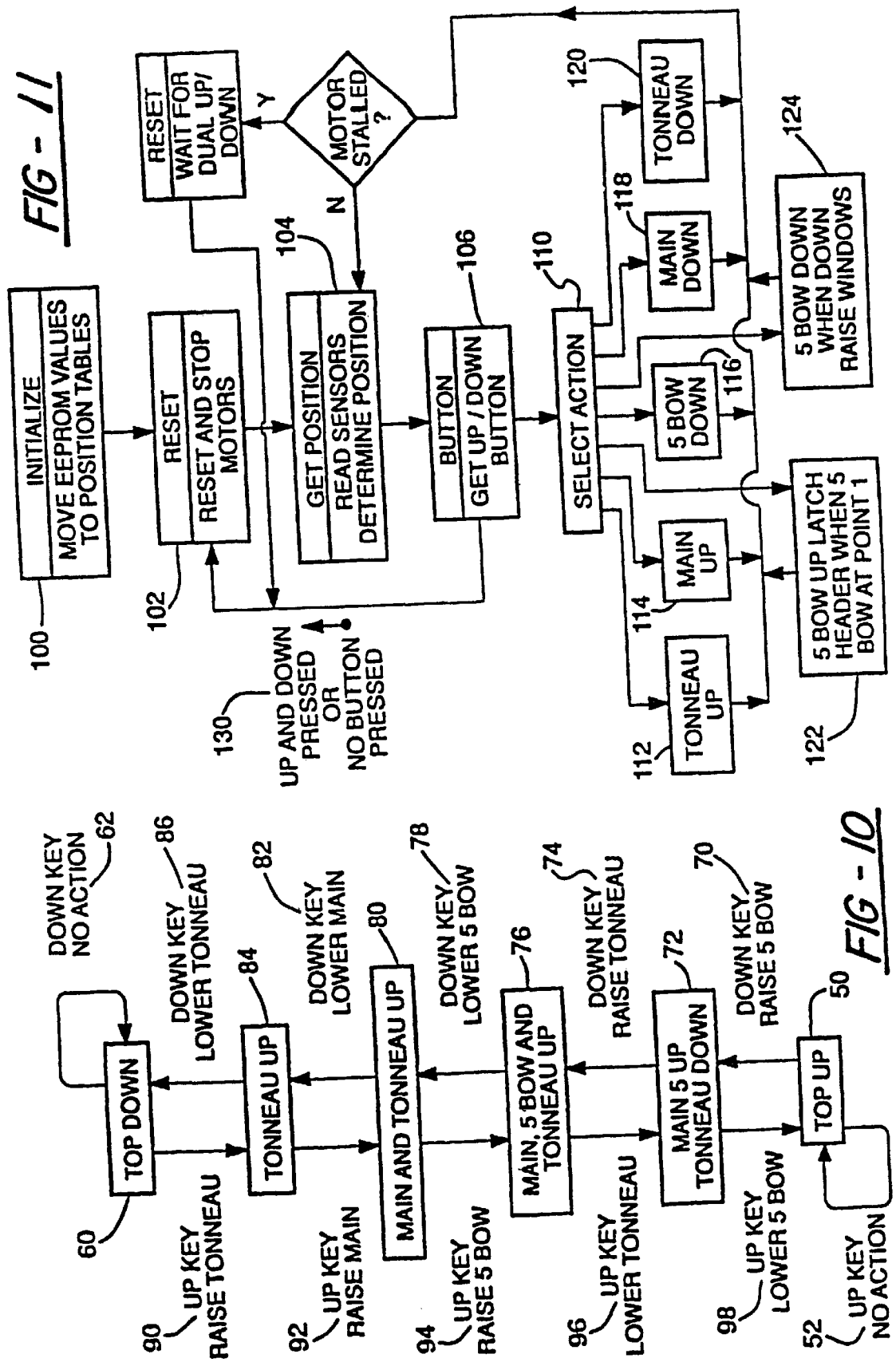

AUTOMOTIVE CONVERTIBLE TOP SYSTEM

CROSS-REFERENCE TO RELATED APPLICATIONS

This application is a continuation of U.S. patent application Ser. No. 09/634,436, filed on Aug. 8, 2000, which is a continuation of U.S. patent application Ser. No. 09/174,697, filed on Oct. 16, 1998, now U.S. Pat. No. 6,114,819, which is a continuation of U.S. patent application Ser. No. 08/524,541, filed Sep. 7, 1995, now U.S. Pat. No. 5,825,147, which is a continuation of U.S. patent application Ser. No. 08/087,194, filed Jul. 2, 1993, now U.S. Pat. No. 5,451,849, which is a continuation-in-part of U.S. patent application Ser. No. 07/817,299, filed Jan. 6, 1992, now U.S. Pat. No. 5,225,747.

FIELD OF THE INVENTION

This invention relates generally to automobile convertible tops, and more particularly to an automobile convertible top that can be opened and closed automatically.

BACKGROUND OF THE INVENTION

In the field of automobile design, convertible tops have been employed to provide the consumer with versatile styling. Most people are familiar with manual convertible tops, which are latched and lowered by hand. However, over the years, many different types of automatic and semi-automatic convertible tops have been developed. Generally, these convertible tops utilize one or more motors to move the various linkages and other movable elements from an extended (or top closed) position to a retracted (top open) position. Through the aid of motorized movement, the user can raise and lower the convertible top more easily.

However, simply providing for motorized movement of the convertible top is not enough. For example, there are known motorized convertible tops that provide for limit sensors on the elements to determine whether the elements are in the "full retracted" or "full extended" position. However, such systems provide no information as to whether the linkage elements are simply near, rather than being at, one of the two fully articulated positions or not. As a result, these known systems, while being capable of causing the convertible top to be opened and closed automatically, require each sensed element to reach an extreme position before commencing the movement of the next element in the sequence necessary to accomplish the desired movement of the convertible top. Thus, it would be advantageous if a motorized convertible top system could allow simultaneous movement of various elements so as to accomplish the opening and closing of the convertible top using a series of movements that are more fluid and continuous and that both reduce the time necessary to accomplish the movements as well as improving the aesthetic appearance of the movements.

Another disadvantage of known motorized convertible tops is the fact that the elements may bind as the movements are sequenced, increasing the load on the motors and risking damage to the motors or elements as the motors try to "force" the elements to move. Especially when trying to accomplish simultaneous movement of multiple elements, the fact that one element may be slightly inhibited in its movement means that the other moving elements will reach their desired position sooner than will the binding element. Allowed to continue uncorrected, this misalignment of elements can result in the convertible top being cocked in an undesirable position and may cause damage to the convertible top mechanism. Therefore, it would be desirable if there were some way to monitor the movement of critical elements while they are moving simultaneously so that remedial action can be taken in the event that a misalignment situation arises. The remedial action could include stopping the movement of other elements while the binding element is still moved, allowing the slower, binding element to "catch up" with the other elements. The remedial action could also include reversing the movement of some elements in order to realign the convertible top, and, once realignment is achieved, resuming normal movement of the elements. The remedial action could also include detecting an unrecoverable misalignment and shutting down the motors before the motors are overburdened.

SUMMARY OF THE INVENTION

It is therefore an object of the present invention to provide a system and method for lowering and raising an automobile convertible top where motive means, such as electric motors, move the various structural elements of the convertible top. Sensors are associated with the convertible top's structural elements whereby the system determines the instantaneous position of the various structural elements as they are moved and commands further movement based upon the sensed positions of the elements. One advantage of the present invention is that the structural elements can be moved simultaneously to achieve a more fluid sequence of movements and to decrease the amount of time it takes to extend and retract the convertible top.

Another disadvantage is that, because the instantaneous positions of the various structural elements are being monitored, the system and method are capable of instituting remedial action in the event that the structural elements become misaligned during the sequence of movements. A further important feature of the presently preferred embodiment is that the monitoring of the convertible top's structural elements is accomplished through the use only a few sensors, thereby simplifying the assembly of the system and reducing the cost associated therewith. Another feature of the presently preferred embodiment is that the system and method are capable of diagnosing failures within the system, and generating failure indications, whereby the automobile owner or a qualified service person can interpret the error information and perform the necessary repairs.

BRIEF DESCRIPTION OF THE DRAWINGS

Other objects, features and advantages of the present invention will become more apparent after understanding the following description of the presently preferred embodiment in conjunction with the drawings in which:

FIGS. 10 and 11 are flow charts depicting the control methodology employed to ensure proper sequencing of the various structural elements as the convertible top is retracted and extended.

DETAILED DESCRIPTION OF THE PREFERRED EMBODIMENTS

Figure 1:
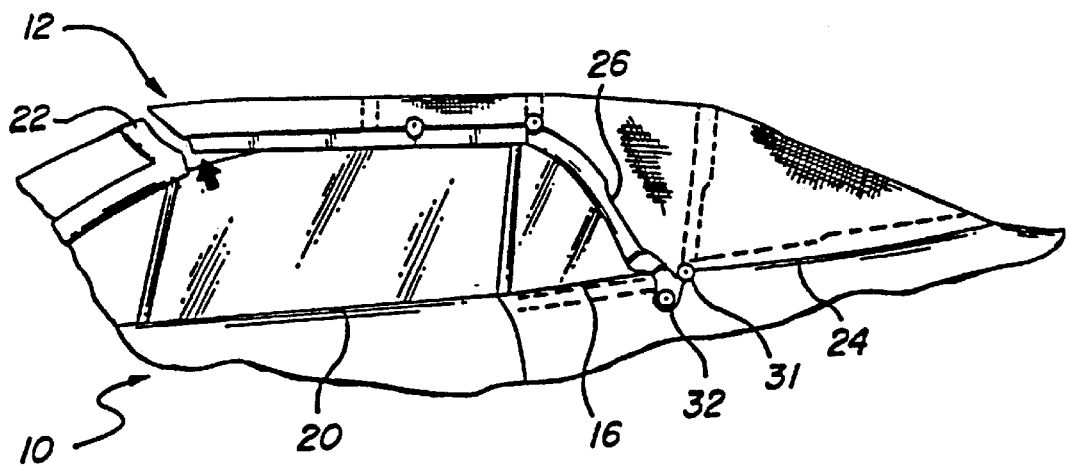
FIGS. 1 through 8 are diagrams illustrating the movement of the elements of the convertible top as it is retracted and extended.

As illustrated in FIGS. 1 through 8, the present invention is directed toward a mechanism which can automatically raise and lower an automobile convertible top. As can be appreciated by those of ordinary skill in the art, while each different type of automobile requires a different convertible top suited to the particular vehicle, the concepts disclosed herein are equally applicable to a wide variety of configurations. In the presently preferred embodiment, the portions of vehicle 10 of interest for the purposes of this discussion are the convertible top 12 which is stored in a compartment beneath a tonneau cover 14, the rear quarter windows 16 and the front side windows 20. Also, although not specifically shown in the drawings, the vehicle has a trunk lid located rearward of the tonneau cover. Generally, the tonneau cover 14 must be raised and the windows 16, 20 must be lowered before the convertible top 12 is lowered or raised. This insures that the top 12 will be properly stored in the compartment beneath the tonneau cover 14 and also insures that the windows 16, 20 are clear of the top 12 as it moves, thereby preventing damage. Similarly, the trunk lid generally should not be opened when the tonneau cover 14 is raised.

More particularly, the lowering, or retracting, of the convertible top occurs in the following manner. In this embodiment, the convertible top cannot be raised or lowered unless the vehicle is stopped. This prevents the driver from accidentally moving the top while under way, and can be accomplished several ways. One way is to determine whether the transmission shift lever is in "park," and another way involves measuring wheel speeds and/or vehicle speed to see if the speed is zero. Since the transmission shift lever position, wheel speeds and/or vehicle speed are already monitored on most cars to accomplish other functions such as engine fuel management and anti-lock braking, tapping into one or more of these signals would be fairly simple for one of ordinary skill.

With the car stopped, the first step, as shown in FIG. 1, involves unlatching the top 12 from the header 22. This is disclosed in assignee's issued U.S. Pat. No. 5,058,939, the disclosure of which is hereby incorporated by reference. However, it can also be appreciated that other forms of latches could be used. Additionally, the latches could be manual, with conventional sensors to indicate whether the person operating the car has yet unlatched the latches. Next, to prevent accidental collisions between components, the trunk lock release is disabled to prevent the trunk lid from being opened into the path of the moving tonneau cover 14 and/or top stack 12. Once the latches are unlatched and the trunk release disabled, the rest of the movements necessary to lower the top 12 can commence.

Figure 2:
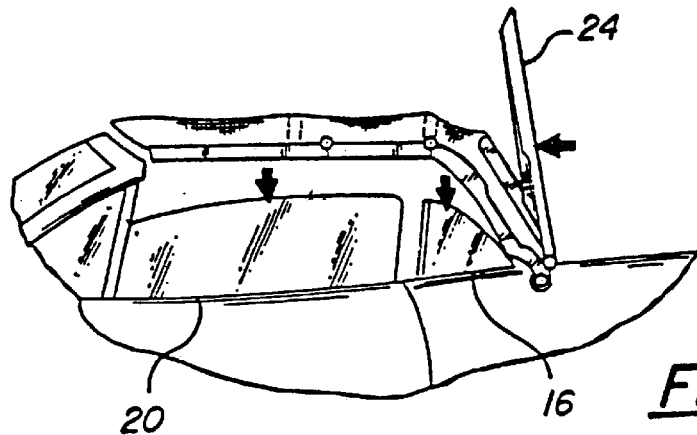

The next movement in the sequence, shown in FIG. 2, is the raising of the rear bow 24 so that the tonneau cover 14 can be raised, and the lowering of the forward side windows 20 and rear quarter windows 16. The forward side windows 20 and rear quarter windows 16 are lowered to allow the top to move freely without worry of damaging the windows 16, 20. IN this embodiment, the windows have an "express down" feature which permit the windows to be lowered completely after only holding down the window control button for a few seconds. Since express down requires special circuitry to allow such a feature, the control system of the presently preferred embodiment exploits this circuitry to accomplish the automatic lowering of the windows when the convertible top is set in motion.

Figure 3:
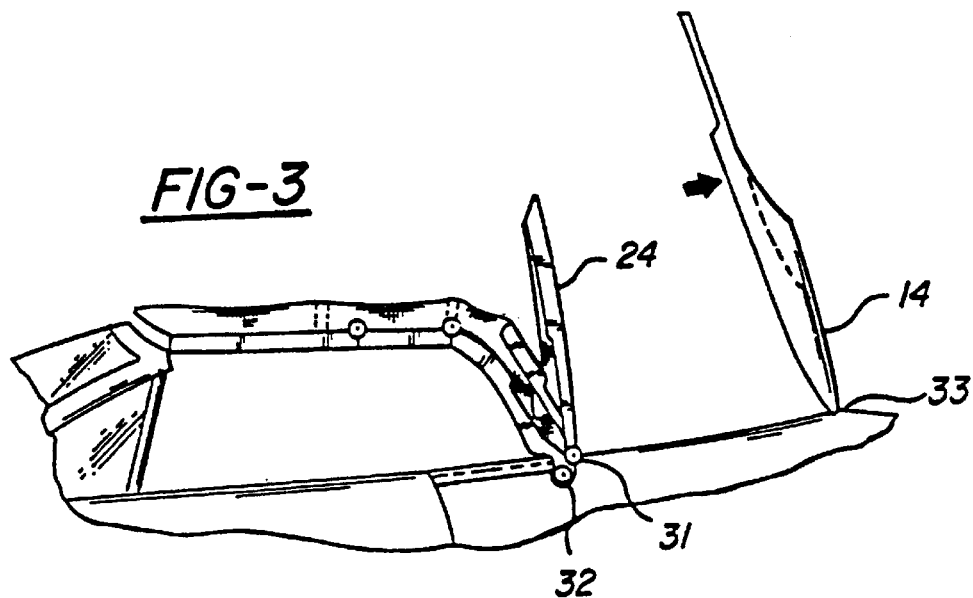
Figure 4:
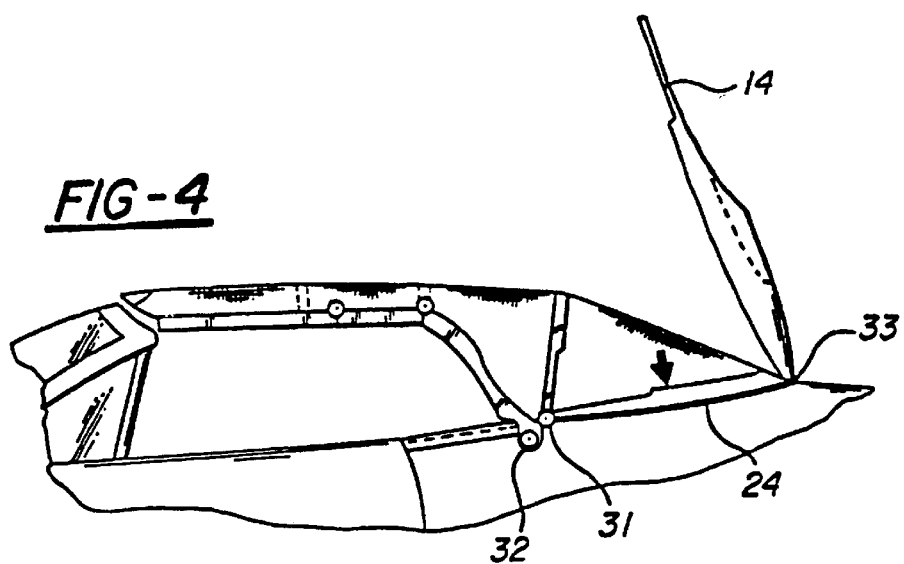
Figure 5:
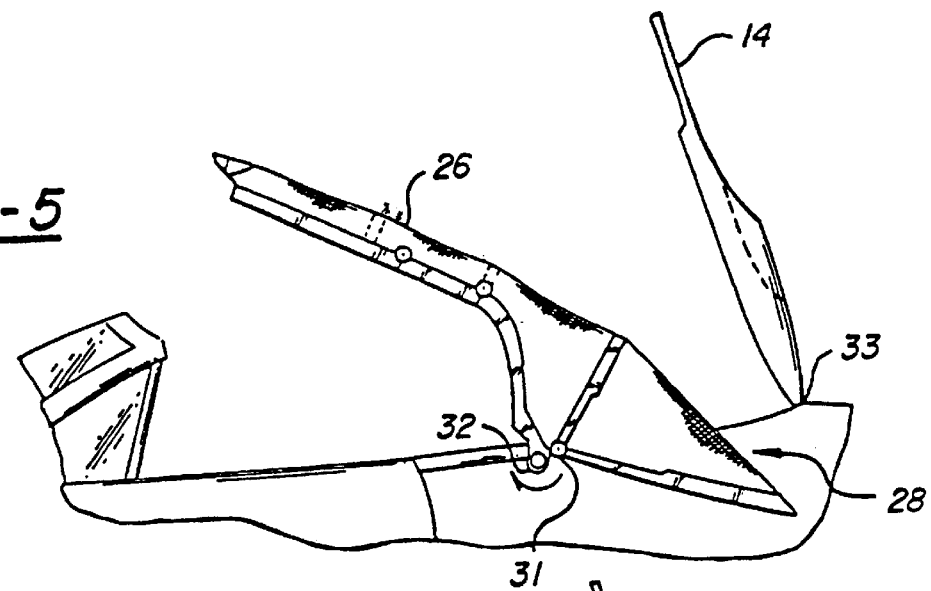
Figure 6:
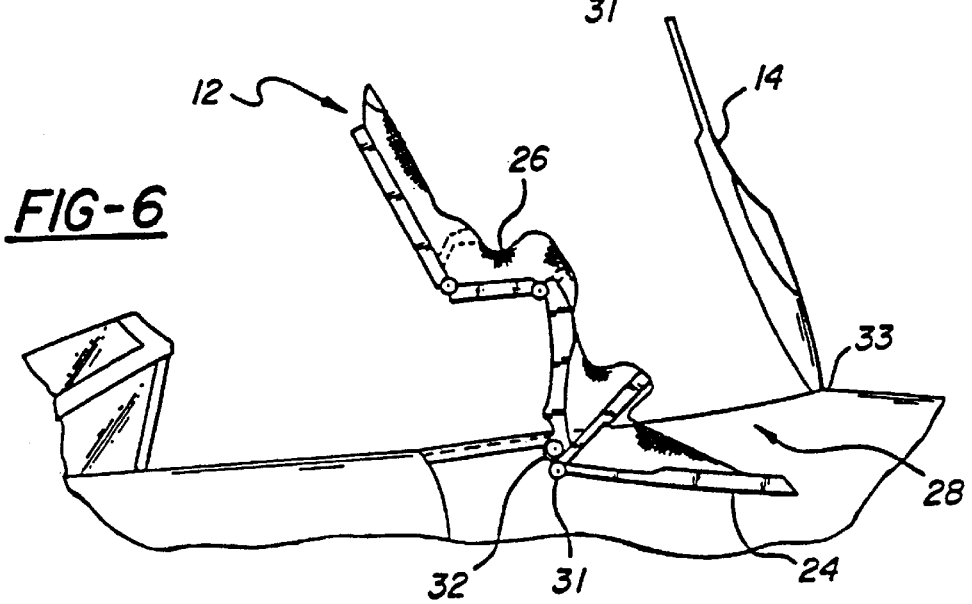
Figure 7:
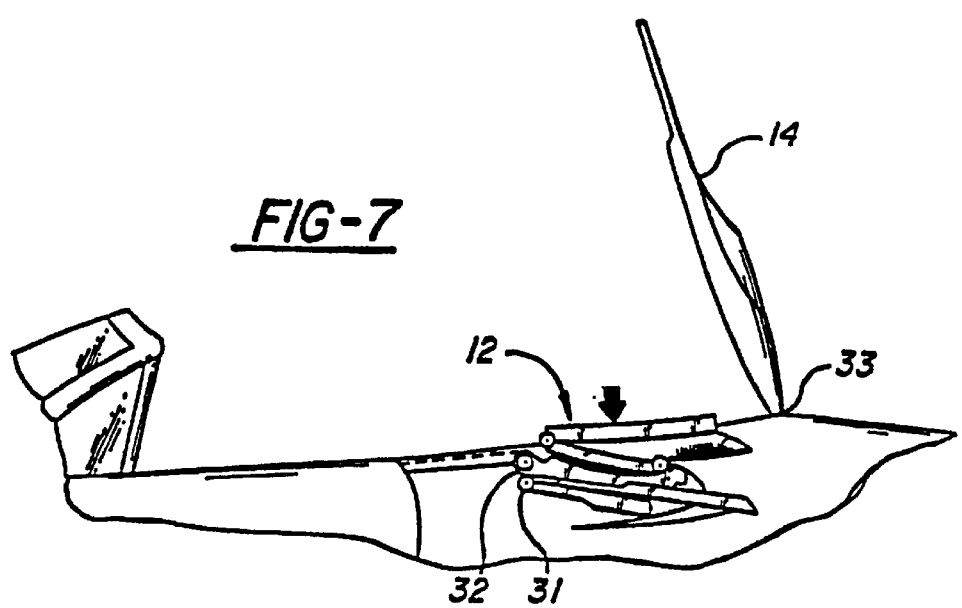
Figure 8:
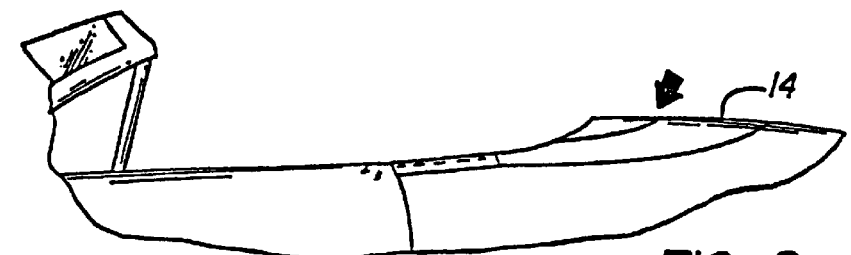

Once the rear bow 24 reaches a position clear of the of the sweep path of the tonneau cover 14, the tonneau cover begins raising, as shown if FIG. 3. Next, once the tonneau cover 14 reaches a position clear of the sweep path of the rear bow 24, the rear bow lowers, as shown in FIG. 4, and the main rail of the convertible top 26 begins lowering into the compartment 28 beneath the tonneau cover 14, as shown in FIGS. 5–7. Finally, once the top is retracted into the compartment 28 and is clear of the sweep path of the tonneau cover 14, as shown in FIG. 7, the tonneau cover 14 is lowered to cover the compartment 28, and the windows raised as shown in FIG. 8. To raise the convertible top 12, the sequence of movements are simply reversed. The linkages forming the support frame of the convertible top and the motors used to move the linkage can be of conventional design, such as disclosed in U.S. Pat. Nos. 3,180,675 and 3,312,058.

Figure 9:
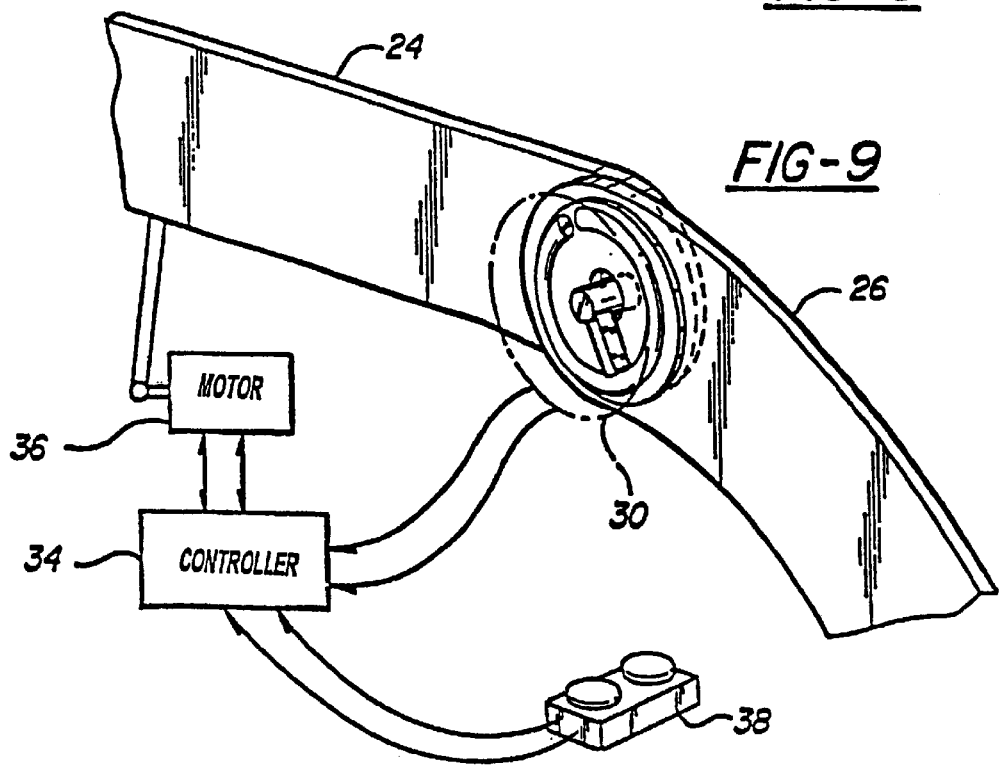
FIG. 9 is a functional diagram detailing the relationship between the motor, sensor, structural element and controller at one particular pivot point in the convertible top mechanism.

In order to provide the unique control of this invention which allows the various elements, such as the latches, rear bow 24, tonneau cover 14 and main rail 26 to move in a fluid, simultaneous fashion, a unique arrangement of sensors is provided. As illustrated in FIG. 9, each top stack position sensor in the preferred embodiment takes the form of a rotary variable resistance device or potentiometer 30 mounted at the pivot point of a pair of elements or links. When mounted at a pivot point between links, the sensor senses the relative position of one link with respect to the other. Similarly, when mounted at a pivot point between a link and the vehicle's chassis, the sensor senses the relative position of the link with respect to the chassis. It can thus be appreciated that these sensors should be provided at each critical pivot point in the mechanism. Here, Applicants have discovered that only three top stack position sensors are required to achieve full control of the top. The three critical points of relative movement requiring sensing are: 1) the position of the rear bow 24 with respect to the main rail 26; 2) the position of the main rail 26 with respect to the vehicle chassis, or body; and 3) the position of the tonneau cover 14 with respect to the vehicle body. The position sensors are mounted at these three critical pivot point 31, 32 and 33. For example, as detailed in FIG. 9, the sensor provided at the pivot point 31 of the rear bow 24 is shown diagrammatically in greater detail. Here it can be seen how the potentiometer 30 measures the relative position between the rear bow 24 and the main rail 26. The pivot point sensors are electrically connected to the controller 34 which monitors the positional information provided by the sensors (i.e. voltage or amperage) and, in response to these signals, commands the movement of the convertible top 12.

In this embodiment, cantilevered DC motors move the various elements, although it should be appreciated that other motive means could be utilized, such as, for example, hydraulic motors. However, DC motors have been selected for several reasons. First, the power draw of DC motor is directly proportional to motor torque. This allows the loading of the motor to be monitored to protect against overburdening the motor. Second, DC motors can be manually back-driven more easily than can hydraulic mechanisms. This helps ensure manual override of the system can be effected in the event the system fails.

In order to move the tonneau cover 14, rear bow 24 and main rail 26, the movement of the DC motors is governed by the controller 34. As illustrated, the rear bow motor 36 raises and lowers the rear bow 24, and the rear bow potentiometer 30 measures the relative angular position of the rear bow 24 with respect to the main rail 26. In response to the detected position of the rear bow, as well as the positions of the other elements, the controller 34 issues commands to the rear bow motor 36 to raise or lower the rear bow 24 as needed. The other motors are similarly controlled. Likewise, the control of the windows involves the use of window drive motors and window position sensors which detect whether the windows are in the full up or full down position.

The interaction of the controller 34, DC motors, sensors and various interlocks can be better understood by referencing the flow charts of FIGS. 10 and 11. The controller 34 is powered by the vehicle's electrical system, and includes driver circuits for providing current to the motors, A/D converters for sensing the stall condition of the motors and for receiving the instantaneous positional information provided by the potentiometers and position sensors, and command input lines for receiving and interpreting the "top up" or "top down" signals issued by the automobile driver through the up/down switches 38, all of which are interfaced to a microprocessor. It can be appreciated by those of ordinary skill in the art that the electronics and circuitry comprising the controller 34 can take a variety of forms, however the microprocessor, converters and drivers selected for this embodiment provide a convenient means by which to execute the invention.

In this embodiment, the controller 34 monitors the linkage element positional information provided by the sensors to determine the instantaneous position of the linkage elements. It also monitors sensors associated with latches, interlocks and position switches to determine positional and status information of components such as the header and rear bow latches, the trunk release solenoid, the windows and whether or not the vehicle is stopped. The controller 34 also monitors for a stall condition at the motors to determine if a motor is being unduly loaded, such as would occur if the linkage being driven by the motor were jammed. Within the logic circuitry of the microprocessor of the controller 34 are instructions for interpreting the monitored information and for directing current to the motors to drive the motors in accordance with the action desired by the automobile driver.

In this embodiment, the driver is provided with "up" and "down" buttons located on the dashboard. These directional control buttons 38 are electrically linked to the controller 34 and determine which sequence of movements of the convertible top 12 are desired. As shown in FIG. 10, the general control system logic progresses in the following manner. If the driver presses the "up" button and the top 12 is already fully raised, no action is taken, as indicated by function block 50 and action nmenomic 52. Similarly, if the "down" button is pressed while the top 12 is fully lowered, no action is taken 60, 62. However, the normal course of events would be that the "down" button is pressed when the top 12 is up, and the "up" button pressed when the top 12 is down.

It should be noted that, in this embodiment, the driver must continue to depress the "down" button for the top 12 to continue moving down, and must continue pressing the "up" button for the top to continue moving up. This allows the driver to pause or even reverse movement of the top by simply releasing the button and pressing the opposite direction. One of ordinary skill can appreciate that the driver may wish pause movement of the top to perform other tasks, or may wish to reverse movement of the top if he changes his mind about opening or closing the top.

When the top is up 50 and the "down" button is pressed, the controller 34 senses the directional command desired by the automobile driver and begins initiating the sequence of movements necessary to lower the top 12. First, provided the vehicle is stopped, the J-hooks are unlatched, the windows are lowered and the rear bow 24 is raised 70 until the positional sensors indicate that the rear bow is in the up position and the tonneau cover is in the down position 72. Provided the "down" button is still being depressed, the next action is to raise the tonneau cover 74. The positional information provided by the sensors should then be that the rear bow, main rail and tonneau cover are in the up position 76. Now that the tonneau cover is clear, the rear bow is lowered 78, leaving only the tonneau cover in the up position 84. Finally, the tonneau cover is lowered and the windows raised 86, completing the lowering 60 of the convertible top 12. Of course, as was previously disclosed, none of these movements would be allowed to take place unless the car is stopped. Likewise, the trunk release would be disabled to prevent accidental opening of the trunk during these movements.

To raise the convertible top 12, the process is simply reversed. Thus, the controller senses the "up" command issued by the automobile driver and begins the sequence of actions necessary for raising the top 12. First, the tonneau cover is raised and windows lowered 90, leaving the main rail and rear bow in the down position but the tonneau cover in the up position 84. Once the tonneau cover is clear, the main rail is raised 92 so that both the tonneau cover and main rail are in the up position 80. Next, the rear bow is raised 94 so that all elements are in the up position 76. Once the rear bow is clear of the sweep path, the tonneau cover is lowered 96, leaving the main rail and rear bow up 72. Finally, the rear bow lowers, the J-hooks latch and the windows raise 98, completing the sequence of motions necessary to raise the top.

As shown in FIG. 11, the actual logic process includes the steps of initializing the controller upon power-up 100 and resetting the logic control sequence 102. Next, the controller determines the status of the vehicle parameters, reads the position sensor and directional command switch information 104, and determines the position of the linkage elements with respect to the directional command desired 106. Based upon this information, the proper movement in the sequence of movements is selected 110 and commanded 112–124. It can be appreciated from this diagram that while each given motion sequence is executed 112–124, the controller returns to the beginning of the control logic sequence and reassesses the positional and direction information 104, 106 in order to determine 110 the next desired motion 112–124.

Since people normally only open the convertible top of an automobile when the weather is pleasant, the top may remain up and the motorized convertible top mechanism remain inactive for long periods of time, such as during the winter. Because of this, the presently preferred embodiment employs current wetting during the initialization step 100. During current wetting, a short burst of electrical current is sent through the motor driver circuitry. This short burst of current is not enough to actually energize the system and cause movement, but is rather designed to ensure the various connectors and relay contact points do not become corroded during their period of dormancy. For example, the up/down button 38, being a mechanical device, swipes away any buildup every time the driver depresses the button. However, since the connectors are rarely disengaged to inspect for and remove buildup, the current wetting pulse travelling through the connectors during each and every initialization sequence helps retard the growth of buildup. Moreover, the controller can monitor the response to the current wetting pulse to help detect circuit interruptions, such as opens or shorts, during initialization.

Also, it should be appreciated that, prior to executing a selected action 110, the controller 34 first ensures that the vehicle is stopped. Presuming that the vehicle is equipped with wheel speed sensors, the vehicle is considered stopped when the wheel speeds are all zero. Furthermore, once movement of the convertible top is undertaken and until the top reaches the fully opened (FIG. 1) or fully closed (FIG. 8) positions, the trunk lid release is disabled. This prevents the driver from accidentally releasing the trunk lid while the convertible top is in motion, and helps prevent damage to both the convertible top and the trunk lid.

The presently preferred embodiment further includes an interlock which interfaces with the automobile's alarm system. When the convertible top is either fully up or fully down, a signal indicating such is transmitted from the convertible top controller 34 to external devices, such as the auto alarm system. For example, in the presently preferred embodiment, when the convertible top controller 34 senses that the top stack is fully up, an "up" relay is latched. The latching of the relay can thereafter be monitored by external devices, such as the alarm system, so that appropriate action may be taken. In the case of an auto alarm, information as to whether the top stack is fully up or fully down may be used to affect the alarm mode. Finally, the convertible top controller 34 provides information to other vehicle controllers via the vehicle's controller bus. This allows alert messages to be displayed to the driver and enables the other vehicle controllers to modify operating characteristics as needed to accommodate the actions of the convertible top.

In practice, the control logic progresses as described in conjunction with FIG. 10, with the additional features of detecting improper linkage positioning and/or excessive motor loading, and selects the motion sequence 112–124 necessary to remedy the situation. Thus, for example, if the controller 34 is currently commanding the tonneau cover to raise 112 and a stall condition is detected at the motor driving the tonneau cover, the controller stops the motor 102 and reassesses the positional information 104 to determine if another action is required. Similarly, in the event that the tonneau cover is being raised 112 but the rear bow slips into the path of the tonneau cover, the positional information 104 will reveal this potentially damaging situation and initiate the raising of the rear bow to insure the tonneau cover has proper clearance to move. Finally, in the event that an unrecoverable error occurs, the up and down buttons can be depressed simultaneously 130 to reset the system. Upon resetting, qualified service personnel can access the controller 34 and receive error information such as whether one of the sensors has become grounded or shorted or whether one of the motors is experiencing difficulty. Thus, service can be provided more quickly and cheaply because the convertible top system is self-diagnosing.

More particularly, the error detection and logging scheme employed in the presently preferred embodiment utilizes several unique concepts. First instantaneous position information can be utilized to allow overlapping, or simultaneous, movements. Second, the instantaneous position information can be used to determine whether the top is moving as desired or if an error has occurred. Third, the instantaneous position information allows the controller to command those precise movements necessary to achieve the fluid opening and closing of the top without risking accidental overlap collisions between elements. Finally, the instantaneous position information allows the controller to initiate remedial action in the event an overlap condition or stall condition is detected.

First, the manner in which instantaneous positions are monitored will be described in greater detail. For any two given elements, there exists a range of positions where the sweep path of the elements intersect. Outside of these ranges, the elements can move freely without worry of collision. However, within that range, care mush be taken to avoid accidental collision between simultaneously moving elements. In this embodiment, the elements which have intersecting sweep paths are the rear bow and the tonneau, the main rail and the tonneau, and the main rail and header latch. Additionally, the controller should be aware of the latched state of the header and rear bow latches. For the various top stack elements, the ranges of motion can be categorized into four states: the first state corresponding to a first extreme position, the last state corresponding to the opposite extreme position, and the second and third states corresponding to the beginning and end, respectively, of the range where the element's sweep path intersects another element's sweep path. For example, as measure by the potentiometers, the lowest possible position is given a state definition of "State 0". Likewise, the upper most position is given a state definition of "State 3". When moving from low to high, the point at which overlap starts is given a state definition of "State 1" and the position where overlap ceases is given a state definition of "State 2". Using the state definitions of 0 through 3, it can be appreciated by one of ordinary skill in the art that binary coding may be used to represent these states. Thus, the low position is represented by binary code 00, the lower boundary of the overlap range represented by 01, the upper boundary of the overlap range represented by 10, and the upper most position by 11. For elements such as the windows, wheel speeds, header latch and rear bow latch, a binary code of simply 0 for down, stopped, or unlatched and 1 up, moving or for latched, respectively, will suffice. Using these state definitions, a hexadecimal status word can be formed.

The status word formed by the logic process of the presently preferred embodiment is an 8-bit word where Bit 7=header latch state Bit 6=rear bow latch state Bit 5, 4=main rail position Bit 3, 2=rear bow position Bit 1, 0=tonneau position While it is convenient to use an 8-bit word as the status word, it can be appreciated by one of ordinary skill in the art that the order of the status bits could be changed and the number of status bits in the status word could be increased or decreased to provide information regarding other status items. For example, in an alternative embodiment, a status bit is provided to indicate whether the vehicle is stopped (0 for moving, 1 for stopped) instead of the header latch status bit.

Using a status word format, every possible combination of positions can be described as a two digit hexadecimal number. For example, with the convertible top up and the rear bow latched, the status word would read 40, or 01000000, which corresponds to Bit 7=0, header unlatched or header latched not monitored, Bit 6=1, rear bow latch, Bit 5, 4=00, main rail fully extended, Bit 3, 2=00, rear bow fully extended, Bit 1, 0=00, tonneau fully extended.

As can be appreciated, in this example, the header latch status bit equaling 0 when the convertible top is fully up and latched would indicate that the header latch is not monitored. If the car were equipped with a header latch which was monitored, the status word would be 11000000, or C0 in hexadecimal. Using the status bit to form status words, the top down sequence, by state, can be represented as follows:

Header Latch status bit, 1=latched, 0=unlatched

Rear Bow Latch status bit, 1=latched, 0=unlatched

Main Rail Position bits, 00=top up, 11=top down, 01, 10=sweep collision region

Rear Bow Position bits, 00=bow down, 11=bow up
01, 10=sweep collision region
Tonneau Cover Position bits, 00=down, 11=up
01, 10=sweep collision region 11000000 C0 top is up, header is latched and rear bow is latched
01000000 40 top is still up, unlatch header, leaver rear bow latched
00000000 00 now unlatch rear bow
00000100 04 rear bow starts raising up and is now in overlap region
00001000 08 rear bow continues raising
00001101 0D rear bow finishes going up, while tonneau cover starts raising up
00001110 0E tonneau cover continues raising and is now in overlap region
00011111 1F tonneau finishes going up, while main rail starts to lower
00101111 2F main rail continues lowering and is now in overlap region
00111110 3E main rail finishes lowering, while tonneau cover starts to lower
00111101 3D tonneau cover continues lowering and is now in overlap region
00111101 3C top is down
01111100 7C top is down and tonneau cover is latched Similarly, the top up sequence, by state, can be represented as follows:

01111100 7C top is down and tonneau cover latched
00111100 3C unlatch tonneau cover
00111101 3D start raising tonneau cover
00111110 3E continue raising tonneau cover
00101111 2F finish raising tonneau cover, while main rail starts raising
00011111 1F continue raising main rail
00001110 0E finish raising main rail, while tonneau cover begins lowering
00001101 0D continue lowering tonneau cover
00001000 08 finish lowering tonneau cover, while rear bow starts lowering
00000100 04 continue lowering rear bow
00000000 00 top is up
10000000 80 latch header The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An automobile having a header, the automobile comprising:
    an automotive convertible top;
    a moveable member associated with said automotive convertible top;
    a cover operable to cover at least a portion of said automotive convertible top when said automotive convertible top is in a stowed position;
    at least one motor mechanism associated with said automotive convertible top and said cover, said motor mechanism operable to move said automotive convertible top and said cover to open and close said automotive convertible top;
    a first position sensor operable to sense movement of said moveable member substantially throughout a range of motion of said moveable member;
    a second position sensor operable to sense movement of said cover substantially throughout a range of motion of said cover;
    a controller operable to actuate said motor mechanism to move said automotive convertible top and said cover in response to inputs from said first position sensor and said second position sensor; and
    at least one header latch operable to latch said automotive convertible top to the automobile header.

2. The automobile as defined in claim 1 wherein said at least one header latch is a manual latch having a sensor operable to sense whether said at least one header latch is in one of a latched and unlatched position.

3. The automobile as defined in claim 1 further comprising a header latch sensor wherein said controller is operable to monitor said header latch sensor to determine positional information of said at least one header latch.

4. The automobile as defined in claim 3 wherein said controller is operable to actuate said at least one header latch to unlatch and latch.

5. The automobile as defined in claim 1 wherein said at least one header latch is a J-hook header latch.

6. The automobile as defined in claim 1 further comprising at least one window automatically lowered in response to a signal from said controller when said automotive convertible top is set in motion.

7. The automobile as defined in claim 6 wherein said at least one window includes a pair of rear quarter windows.

8. The automobile as defined in claim 7 wherein said cover is a tonneau cover.

9. The automobile as defined in claim 1 wherein said controller is further operable to monitor a rear deck lid of said automobile and inhibit movement of said automotive convertible top if said rear deck lid is open.

10. The automobile as defined in claim 1 wherein said controller is further operable to monitor automobile speed to determine if the automobile is moving above a predetermined limit and further operable to inhibit movement of said automotive convertible top if the automobile is moving above said predetermined limit.

11. The automobile as defined in claim 1 wherein said controller is further operable to transmit an alarm signal indicating whether said automotive convertible top is up or down.

12. The automobile as defined in claim 1 wherein said motor mechanism includes a first motor mechanism associated with said automotive convertible top and a second motor mechanism associated with said cover, said first and second motor mechanisms selected from a group consisting of a DC motor and a hydraulic system.

13. The automobile as defined in claim 12 wherein said DC motor can be manually back driven in an event of an electrical system failure.

14. The automobile as defined in claim 1 wherein said first position sensor is a first potentiometer and said second position sensor is a second potentiometer, said first potentiometer being positioned at a pivot point associated with said moveable member.

15. The automobile convertible top system as defined in claim 1 wherein said controller employs a current wetting scheme during power up of said controller, said current wetting scheme providing a short burst of electrical current through said motor mechanism to insure that connectors and relay contact points of said motor mechanism do not become corroded.

16. The automobile as defined in claim 1 wherein said controller interprets sensed positions of said automotive convertible top and said cover and commands said motor mechanism to move said automotive convertible top and said cover in accordance with predetermined movements based upon said interpreted sensed positions.

17. The automobile as defined in claim 16 wherein said controller is operable for logging errors whenever said automotive convertible top or said cover do not move in accordance with said predetermined movements.

18. The automotive convertible top system as defined in claim 17 wherein said predetermined movement comprises a series of sequential movements, wherein each movement of said series of movements is adapted to prevent said automotive convertible top and said cover from colliding with one another, and when said interpreted sensed positions indicate a collision is eminent, said controller commands said motor mechanism to move said automotive convertible top and said cover to corrective positions where no collision is possible.

19. The automobile as defined in claim 1 wherein said automotive convertible top and said cover are simultaneously moved by said motor mechanism as said controller monitors the instantaneous position of said moveable member and said cover with said first position sensor and said second position sensor.

20. The automobile as defined in claim 1 wherein said controller operably measures torque loading of said motor mechanism, and commands said motor mechanism to cease movement of said automotive convertible top when said sensed position indicates said automotive convertible top is in a fully extended first or second position when said controller is moving said automotive convertible top to said first or second position and said measured torque exceeds a predetermined torque for a predetermined length of time, and wherein said controller commands said motor mechanism to cease movement of said cover when said sensed position indicates said cover is in a fully extended third or fourth position when said controller is moving said cover to said third or fourth position and said measured torque exceeds a predetermined torque for a predetermined length of time.

21. An automotive convertible top system for an automobile, said automotive convertible top system comprising:
an automotive convertible top;
a moveable member associated with said automotive convertible top;
a cover operable to cover at least a portion of said automotive convertible top when said automotive convertible top is in a stowed position;
a motor mechanism associated with said automotive convertible top and said tonneau cover, said motor mechanism operable to move said automotive convertible top and said cover to open and close said automotive convertible top;
a first position sensor operable to sense movement of said moveable member substantially throughout a range of motion of said moveable member;
a second position sensor operable to sense movement of said cover substantially throughout a range of motion of said tonneau cover;

a controller operable to actuate said motor mechanism to move said automotive convertible top and said cover in response to inputs from said first position sensor and said second position sensor, said controller further operable to monitor automobile speed to determine if the automobile is moving above a predetermined limit and further operable to inhibit movement of said automotive convertible top if the automobile is moving above said predetermined limit; and
at least one header latch coupled to said automotive convertible top.

22. The automotive convertible top system as defined in claim 21 wherein said at least one header latch is a manual latch having a sensor operable to sense whether said at least one header latch is in one of a latched and unlatched position.

23. The automotive convertible top system as defined in claim 21 further comprising a header latch sensor wherein said controller is operable to monitor said header latch sensor to determine positional information of said at least one header latch.

24. The automotive convertible top system as defined in claim 23 wherein said controller is operable to actuate said at least one header latch to unlatch and latch.

25. The automotive convertible top system as defined in claim 21 wherein said at least one header latch is a J-hook header latch.

26. The automotive convertible top system as defined in claim 21 wherein said predetermined limit is about zero.

27. The automotive convertible top system as defined in claim 21 wherein said controller automatically lowers at least one window when said automotive convertible top is set in motion.

28. The automotive convertible top system as defined in claim 21 wherein said controller is further operable to monitor a rear deck lid of said automobile and inhibit movement of said automotive convertible top if said rear deck lid is open.

29. The automotive convertible top system as defined in claim 21 wherein said motor mechanism includes a first motor mechanism associated with said automotive convertible top and a second motor mechanism associated with said cover, said first and second motor mechanisms selected from a group consisting of a DC motor and a hydraulic system.

30. The automotive convertible top system as defined in claim 21 wherein said first position sensor is a first potentiometer and said second position sensor is a second potentiometer, said first potentiometer being positioned at a pivot point associated with said moveable member.

31. An automobile comprising:
an automotive convertible top;
a moveable member moveable with said automotive convertible top;
a cover operable to cover at least a portion of said automotive convertible top when said automotive convertible top is in a standard position;
a first mechanism connected to said automotive convertible top, said first mechanism operable to move said automotive convertible top;
a second mechanism connected to said cover, said second mechanism operable to move said cover;
a first variable resistance sensor operable to sense movement of said moveable member substantially throughout a range of motion of said moveable member;
a second variable resistance sensor operable to sense movement of said cover substantially throughout a range of motion of said cover;

a controller operable to control said first mechanism to move said automotive convertible top and said second mechanism to move said cover in response to inputs from said first variable resistance sensor and said second variable resistance sensor; and at least one header latch coupled to said automotive convertible top.

32. The automobile as defined in claim 31 wherein said at least one header latch is a manual latch having a sensor operable to sense whether said at least one header latch is in one of a latched and unlatched position.

33. The automobile as defined in claim 31 further comprising a header latch sensor wherein said controller is operable to monitor said header latch sensor to determine positional information of said at least one header latch.

34. The automobile as defined in claim 33 wherein said controller is operable to actuate said at least one header latch to unlatch and latch.

35. The automobile as defined in claim 31 wherein said at least one header latch is a J-hook header latch.

36. The automobile as defined in claim 31 further comprising at least one window automatically lowered in response to a signal from said controller when said automotive convertible top is set in motion.

37. The automobile as defined in claim 31 wherein said at least one window includes a pair of forward side windows and a pair of rear quarter windows.

38. The automobile as defined in claim 31 wherein said first variable resistance sensor is positioned at a pivot point associated with said moveable member.

39. The automobile as defined in claim 31 wherein said controller is further operable to monitor automobile speed to determine if the automobile is moving above a predetermined limit and further operable to inhibit movement of said automotive convertible top if the automobile is moving above said predetermined limit.

40. The automobile as defined in claim 31 wherein said controller is further operable to transmit an alarm signal indicating whether said automotive convertible top is up or down.

41. An automobile comprising:
an automotive convertible top;
a first moveable member associated with said automotive convertible top;
a second moveable member associated with said automotive convertible top;
a mechanism associated with said automotive convertible top, said mechanism operable to move said automotive convertible top;
a first position sensor operable to sense movement of said first moveable member substantially throughout a range of motion of said first moveable member;
a second position sensor operable to sense movement of said second moveable member substantially throughout a range of motion of said second moveable member;
a controller operable to actuate said mechanism to move said automotive convertible top in response to inputs from said first position sensor and said second position sensor; and
at least one header latch in communication with said controller.

42. The automobile as defined in claim 41 wherein said at least one header latch is a manual latch having a sensor operable to sense whether said at least one header latch is in one of a latched and unlatched position.

43. The automobile as defined in claim 41 further comprising a header latch sensor wherein said controller is operable to monitor said header latch sensor to determine positional information of said at least one header latch.

44. The automobile as defined in claim 43 wherein said controller is operable to actuate said at least one header latch to unlatch and latch.

45. The automobile as defined in claim 41 wherein said at least one header latch is a J-hook header latch.

46. The automobile as defined in claim 41 further comprising at least one window automatically lowered in response to a signal from said controller when said automotive convertible top is set in motion.

47. The automobile as defined in claim 46 wherein said at least one window further includes a pair of rear quarter windows.

48. The automobile as defined in claim 41 wherein said controller is further operable to monitor a rear deck lid of said automobile and inhibit movement of said automotive convertible top if said rear deck lid is open.

49. The automobile as defined in claim 41 wherein said controller is further operable to monitor automobile speed to determine if the automobile is moving above a predetermined limit and further operable to inhibit movement of said automotive convertible top if the automobile is moving above said predetermined limit.

50. The automobile as defined in claim 41 wherein said controller is further operable to transmit an alarm signal indicating whether said automotive convertible top is up or down.

51. The automobile as defined in claim 41 wherein said mechanism includes a motor mechanism associated with said automotive convertible top, said motor mechanism selected from a group consisting of a DC motor and a hydraulic system.

52. The automobile as defined in claim 51 wherein said DC motor can be manually back driven in an event of an electrical system failure.

53. The automobile as defined in claim 41 wherein said first position sensor is a first potentiometer and said second position sensor is a second potentiometer, said first potentiometer being positioned at a pivot point associated with said first moveable member.

54. The automobile as defined in claim 41 wherein said controller employs a current wetting scheme during power up of said controller, said current wetting scheme providing a short burst of electrical current through said mechanism to insure that connectors and relay contact points of said mechanism do not become corroded.

55. The automobile as defined in claim 41 wherein said controller interprets sensed positions of said automotive convertible top and commands said mechanism to move said automotive convertible top in accordance with predetermined movements based upon said interpreted sensed positions.

56. The automobile as defined in claim 55 wherein said controller is operable for logging errors whenever said automotive convertible top does not move in accordance with said predetermined movements.

57. The automobile as defined in claim 41 further comprising a tonneau cover and a third posterior sensor operable to sense movement of said tonneau cover substantially throughout a range of motion of said tonneau cover, said controller operable to actuate said mechanism to move said tonneau cover.

58. The automobile as defined in claim 57 wherein said automotive convertible top and said tonneau cover are simultaneously moved by said mechanism as said controller monitors the instantaneous position of said automotive convertible top and said tonneau cover with said first position sensor, said second position sensor, and said third position sensor.

59. The automobile as defined in claim 41 wherein said controller operably measures torque loading of said mechanism, and commands said mechanism to cease movement of said automotive convertible top when said sensed position indicates said automotive convertible top is in a fully extended first or second position when said controller is moving said automotive convertible top to said first or second position and said measured torque exceeds a predetermined torque for a predetermined length of time.

60. A method for operating an automotive convertible top and a cover, said method comprising:

sensing a command, issued by an automobile user, to retract or extend the automotive convertible top;

unlatching at least one header latch in response to the sensed command;

initiating movement of the automotive convertible top and the cover in response to the sensed command;

sensing movement of a moveable member associated with the automotive convertible top substantially throughout a range of motion of the moveable member;

sensing movement of the cover substantially through a range of motion of the cover; and controlling the movement of the automotive convertible top and the cover in response to the sensed position of the moveable member and the cover.

61. The method as defined in claim 60 further comprising transmitting an alarm signal indicating whether the automotive convertible top is up or down.

62. The method as defined in claim 60 further comprising automatically lowering at least one window of the automobile when the automotive convertible top is set in motion.

63. The method as defined in claim 60 further comprising monitoring a rear deck lid of the automobile and inhibiting movement of the automotive convertible top if the rear deck lid is open.

64. The method as defined in claim 60 further comprising monitoring automobile speed to determine if the automobile is moving above a predetermined limit and inhibiting movement of the automotive convertible top if the automobile is moving above the predetermined limit.

65. A method for operating an automotive convertible top having a first moveable member and a second moveable member, said method comprising:

sensing a command, issued by an automobile user, to retract or extend the automotive convertible top;

unlatching at least one header latch in response to the sensed command;

initiating movement of the automotive convertible top in response to the sensed command;

sensing movement of the first moveable member and the second moveable member associated with the automotive convertible top substantially throughout the range of motion of the first moveable member and a second moveable member; and controlling the movement of the automotive convertible top in response to the sensed positions of the first moveable member and the second moveable member.

66. The method as defined in claim 65 further comprising transmitting an alarm signal indicating whether the automotive convertible top is up or down.

67. The method as defined in claim 65 further comprising automatically lowering at least one window of the automobile when the automotive convertible top is set in motion.

68. The method as defined in claim 65 further comprising monitoring a rear deck lid of the automobile and inhibiting movement of the automotive convertible top if the rear deck lid is open.

69. The method as defined in claim 65 further comprising monitoring automobile speed to determine if the automobile is moving above a predetermined limit and inhibiting movement of the automotive convertible top if the automobile is moving above the predetermined limit.

* * * * *

UNITED STATES PATENT AND TRADEMARK OFFICE
CERTIFICATE OF CORRECTION

PATENT NO.    : 6,288,511 B2  
DATED         : September 11, 2001  
INVENTOR(S)   : Michael A. Porter et al.

It is certified that error appears in the above-identified patent and that said Letters Patent is hereby corrected as shown below:

Title page,  
Item [56], References Cited,  
"5,018,784  5/1991  Yokouchi" should be -- 5,018,784  5/1991  Yokouchi et al. --.  
"5,056,857  10/1991  Ney" should be -- 5,056,857  10/1991  Ney et al. --.

Column 2,  
Line 37, after "use" insert -- of --.

Column 3,  
Line 55, "IN" should be -- In --.  
Line 63, delete second occurrence of "of the".  
Line 65, "if" should be -- in --.

Column 4,  
Line 34, "point" should be -- points --.

Column 5,  
Line 41, "nmenomic" should be -- mnemonic --.  
Line 53, "after "wish" insert -- to --.

Column 7,  
Line 64, "mush" should be -- must --.

Column 8,  
Line 10, "measure" should be -- measured --.

Signed and Sealed this

Twenty-fourth Day of December, 2002

JAMES E. ROGAN  
*Director of the United States Patent and Trademark Office*